US012584297B2

(12) United States Patent (10) Patent No.: US 12,584,297 B2
Walczynski et al. (45) Date of Patent: Mar. 24, 2026

(54) METHOD AND SYSTEM OF CONTROLLING A DISPLAY DEVICE ON A WORK MACHINE HAVING GRADE CONTROL

(71) Applicant: Deere & Company, Moline, IL (US)

(72) Inventors: Sarah A. Walczynski, Tonica, IL (US); August D. Hammer, Dubuque, IA (US); Leah B. Leffler, Moline, IL (US); Bryan J. Rausch, Durango, IA (US); Joy Vuijk, Johnston, IA (US)

(73) Assignee: Deere & Company, Moline, IL (US)

( * ) Notice: Subject to any disclaimer, the term of this patent is extended or adjusted under 35 U.S.C. 154(b) by 268 days.

(21) Appl. No.: 17/822,455

(22) Filed: Aug. 26, 2022

(65) Prior Publication Data

US 2024/0068205 A1 Feb. 29, 2024

(51) Int. Cl.
*E02F 9/26* (2006.01)
*G06T 11/60* (2026.01)

(52) U.S. Cl.
CPC .............. *E02F 9/264* (2013.01); *E02F 9/261* (2013.01); *G06T 11/60* (2013.01)

(58) Field of Classification Search
CPC .......... E02F 9/264; E02F 9/261; E02F 3/847; G06T 11/60
USPC ........................................................ 701/34
See application file for complete search history.

(56) References Cited

U.S. PATENT DOCUMENTS

| | | | | | |
|---|---|---|---|---|---|
| 7,293,376 | B2 * | 11/2007 | Glover | .................... | E02F 3/432 |
| | | | | | 701/50 |
| 7,857,071 | B1 * | 12/2010 | McCain | .................... | E02F 9/26 |
| | | | | | 701/50 |
| 10,030,357 | B1 * | 7/2018 | Horstman | ............. | E02F 9/2066 |
| 11,168,466 | B2 * | 11/2021 | Izumikawa | ............... | E02F 3/32 |
| 2014/0176709 | A1 | 6/2014 | Redenbo et al. | | |
| 2014/0232539 | A1 * | 8/2014 | Hiruta | ...................... | G07C 5/08 |
| | | | | | 340/438 |
| 2019/0226176 | A1 * | 7/2019 | Smith | ..................... | E02F 3/432 |
| 2020/0071909 | A1 * | 3/2020 | Harada | ................... | E02F 3/844 |

FOREIGN PATENT DOCUMENTS

EP 3604695 B1 7/2021

OTHER PUBLICATIONS

Merriam-Webster Dictionary, Graphic (dated Jun. 26, 2021) (Year: 2021).*

* cited by examiner

*Primary Examiner* — Helal A Algahaim
*Assistant Examiner* — Ashleigh Nicole Turnbaugh

(57) ABSTRACT

A display system and method for a work machine having grade control is disclosed. The display includes a frame, an attachment coupled to the frame, a first sensor, a second sensor, and a controller. The first sensor is configured to generate a first sensor signal indicative of a frame angle relative to a direction of gravity. The second sensor is configured to generate a second sensor signal indicative of an attachment angle relative to one of the frame and the direction of gravity. The program instructions cause a processor on the controller to receive a first sensor signal, a second sensor signal, and a target grade input; determine a cross slope and a mainfall, and control a display device to display a singular graphic of the position of the attachment relative to the target grade.

21 Claims, 6 Drawing Sheets

METHOD AND SYSTEM OF CONTROLLING A DISPLAY DEVICE ON A WORK MACHINE HAVING GRADE CONTROL

TECHNICAL FIELD

The disclosure generally relates to a method and system of controlling a work machine having grade control.

BACKGROUND

Grading operations with work machines is a specialized phase of the construction process. Proper ground preparation ensures expected outcomes in architectural construction, control of water runoff, road construction, environmental impact and compliance with land grading standards. Current work machines utilize LED light bars to communicate a position of an attachment to an operator on grade control. However, this form of grade control display has limitations in the amount of information and type of information communicated to the operator. Furthermore, the LED light bars lack a standardized interface from one type of work machine to another. Therein lies an opportunity to improve the real-time communication of grade control to an operator.

SUMMARY

A display system and method for a work machine having grade control is disclosed. The display system comprises of a frame of the work machine, an attachment movable coupled to the frame via a boom assembly, a first sensor, a second sensor, and a controller. The first sensor is configured to generate a first sensor signal indicative of a frame angle relative to a direction of gravity. The second sensor is configured to generate a second sensor signal indicative of an attachment angle relative to one of the frame and the direction of gravity. The controller has a non-transitory computer readable medium with a program instruction to grade a surface. The program instruction when executed causes a processor of the controller to do the following. The controller receives the first sensor signal from the first sensor coupled to the frame, the second sensor signal from the second sensor coupled to the attachment, and a target grade input. The controller then determined a cross slope and a mainfall of the attachment. Finally, the controller controls a display device to display a singular graphic of a position of the attachment relative to a target grade, wherein the singular graphic represents the cross slope of the attachment and the mainfall of the attachment relative to the frame.

The singular graphic comprises of a first graphic element representing the cross slope of the attachment, a second graphic element representing a frame reference for the first graphic element, and a third graphic element representing the target grade. The second graphic element may be a horizontal line. The third graphic element may be rectangular, and further represent a tolerance of the target grade. The singular graphic may represent a cutting edge of the attachment relative to the frame, and/or the target grade.

The display system may further comprise one of a numerical representation of a magnitude of one of the cross slope and the mainfall; and a color-coded representation of the magnitude of one of the cross slope and the mainfall.

The display system may further comprise of a fourth graphic element comprising of a vertical line creating a crosshair with the second graphic element wherein vertical placement of the first graphic element relative to the second graphic element represents the mainfall of the attachment.

A method of controlling a work machine having a grade control system is also disclosed. The method comprises of receiving a first sensor signal from a first sensor coupled to a frame of the work machine wherein the first sensor signal is indicative of a frame angle relative to a direction of gravity. The method then includes receiving a second sensor signal from a second sensor coupled to the attachment coupled, wherein the attachment is coupled to the frame. The second sensor signal is indicative of an attachment angle relative to one of the frame and the direction of gravity. In a next step, the method includes receiving a target grade input, determining a cross slope of the attachment and a mainfall of the attachment. Finally, the method includes controlling a display device to display a singular graphic of a position of the attachment relative to a target grade, wherein the singular graphic represents the cross slope of the attachment and the mainfall of the attachment relative to the target grade. The method may further comprise identifying a sensor type of the first sensor and the second sensor, and controlling a display device to display a second graphic of the sensor type.

The above features and advantages and other features and advantages of the present teachings are readily apparent from the following detailed description of the best modes for carrying out the teachings when taken in connection with the accompanying drawings.

DETAILED DESCRIPTION

Figure 1:
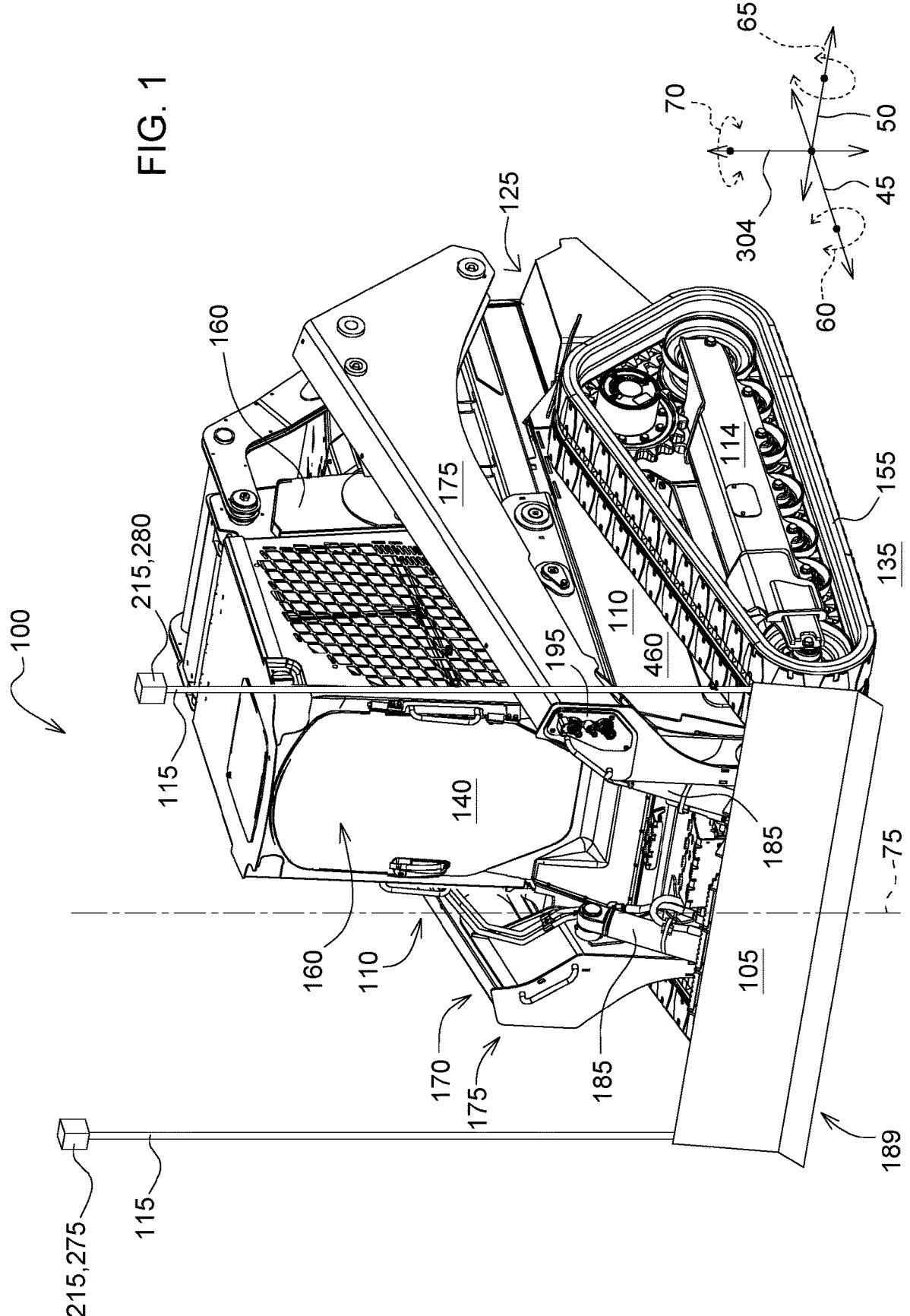
FIG. 1 is a side view of one embodiment of a work machine, shown as a skid steer.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, "controller" 10 is intended to be used consistent with how the term is used by a person of skill in the art, and refers to a computing component with processing, memory, and communication capabilities, which is utilized to execute instructions (i.e., stored on the memory 20 or received via the communication capabilities) to control or communicate with one or more other components. In certain embodiments, the controller 10 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 10 may be in communication with other components on the work machine 100, such as hydraulic components, electrical components, and operator inputs within an operator station of an associated work machine. The controller 10 may be electrically connected to these other components by a wiring harness such that messages, commands, and electrical power may be transmitted between the controller 10 and the other components. Although the controller 10 is referenced in the singular, in alternative embodiments the configuration and functionality described herein can be split across multiple devices using techniques known to a person of ordinary skill in the art. The controller 10 includes the tangible, non-transitory memory 20 on which are recorded computer-executable instructions, including a control algorithm. The processor 30 of the controller 10 is configured for executing the control program instructions 40.

The controller 10 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 20 may include any non-transitory/tangible medium which participates in providing data or computer-readable instructions. The memory 20 may be non-volatile or volatile. Non-volatile media may include, for example, optical or magnetic disks and other persistent memory. Example volatile media may include dynamic random-access memory (DRAM), which may constitute a main memory. Other examples of embodiments for memory 20 include a floppy, flexible disk, or hard disk, magnetic tape or other magnetic medium, a CD-ROM, DVD, and/or any other optical medium, as well as other possible memory devices such as flash memory.

As such, a method 300 may be embodied as a program instruction 40 operable on the controller 10. It should be appreciated that the controller 10 may include any device capable of analyzing data from various sensors, comparing data, making decisions, and executing the required tasks.

Referring now to the drawings, FIG. 1 illustrates a side view of a work machine 100, depicted as a skid steer with an attachment 105 operatively coupled to the work machine 100. It should be understood, however, that the work machine 100 could be one of many types of work machines, including, and without limitation, a skid steer, a backhoe loader, a front loader, a bulldozer, and other construction or agricultural vehicles with a grading capacity. The work machine 100, as shown, has a frame 110, having a front-end section, or portion, and a rear-end portion 125. The work machine 100 includes a ground-engaging mechanism 155 that supports the frame 110 and an operator cab 160 supported on the frame 110. The operator cab 160 is optional if the cab is operated remotely and/or autonomously. The ground-engaging mechanism 155 may be configured to support the frame 110 on a surface 135. The work machine 100 may be operated to engage the ground and cut and move material to achieve simple or complex ground features on the ground. As used herein, direction with regards to the work machine is the direction such as operator faces. The work machine may experience movement in three directions and rotation in three directions. Direction for the work machine may also be referred to with regard to longitude 45 or the longitudinal directions, latitude 50 or the lateral direction, and vertical 55 of the vertical direction. Rotations for the work machine may be referred to roll or the roll direction 60, pitch 65 or the pitch direction, and yaw 70 or the yaw direction or heading.

A power source is coupled to the frame 110 and is operable to move the work machine 100. The illustrated work machine 100 includes wheels, but other embodiments may include one or more tracks or wheels that engage the surface 135. In this exemplary embodiment, the ground-engaging mechanism 155 on the left side of the work machine 100 may be operated at a different speed, or in a different direction, from the ground-engaging mechanism 155 on the right side of the work machine 100.

Figure 2:
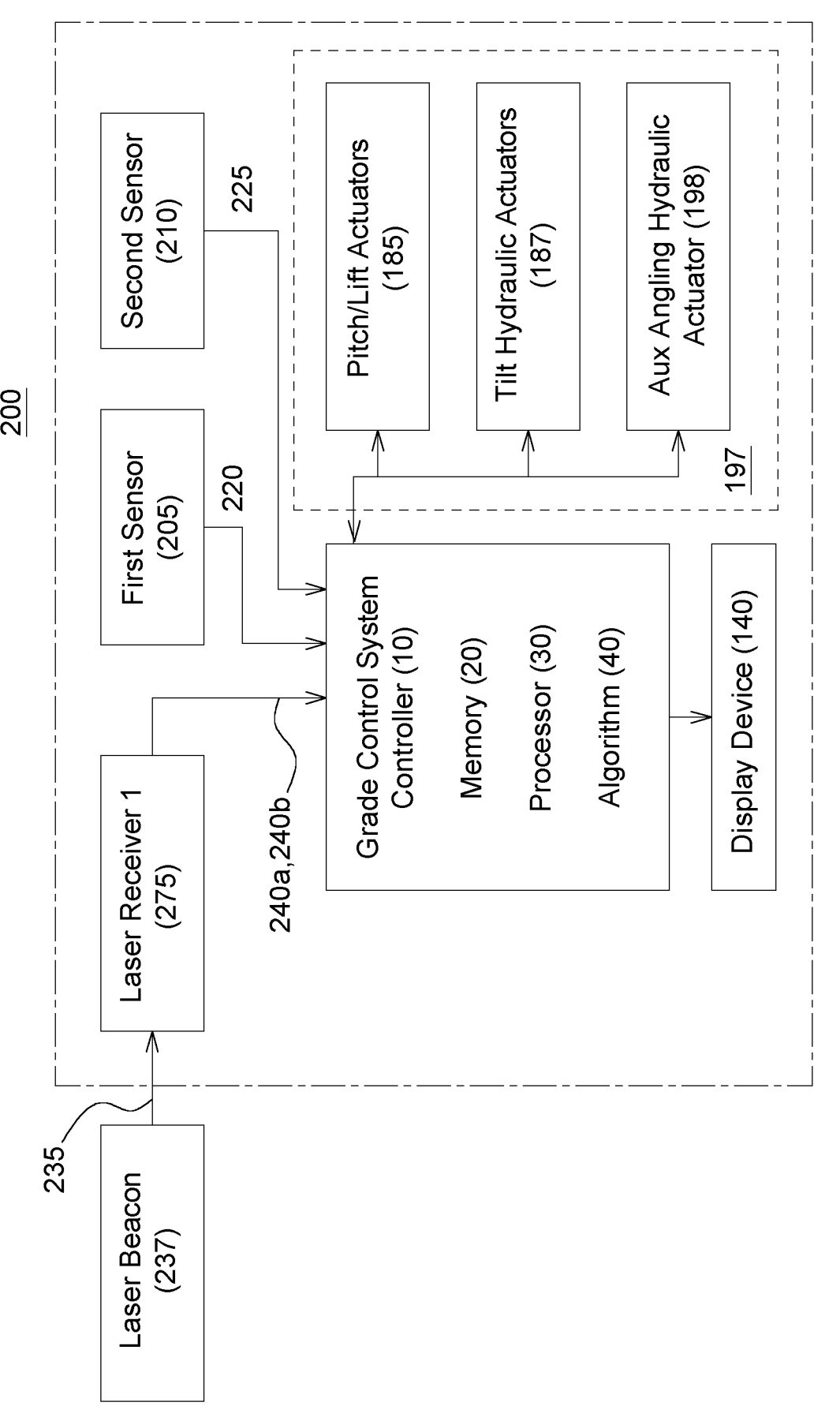
FIG. 2 is a block diagram of the system architecture and the flow of the grade control system.

Now referring to both FIGS. 1 and 2, the work machine 100 comprises the boom assembly 170 coupled to the frame 110. The attachment 105 (may also be referred to as work tool) may be coupled at a forward portion of the boom assembly 170 (e.g. a blade) while the rear portion of the boom assembly 170 is pivotally coupled to the frame 110. The attachment 105 at the forward portion of the boom assembly 170 may be coupled through an attachment coupler (not shown), an industry standard configuration or a coupler universally applicable to many Deere attachments and several after-market attachments.

The boom assembly 170 of the exemplary embodiment, comprises a first pair of boom arms 175 (one each on a left side and a right side) pivotally coupled to the frame 110 and moveable relative to the frame 110 by a pair of boom hydraulic actuators (not shown). During a grading operation, the boom arms 175 remain stationary. The attachment coupler is coupled to a forward section of the boom arms 175 and are moveable relative to the frame 110 by a pair of pitch/lift actuators 185. The frame 110 of the work machine 100 further comprises an auxiliary port 195 on the front-end portion of the work machine to couple one or more auxiliary hydraulic actuators (i.e. hydraulic actuators found on the attachment) to drive movement of or actuate auxiliary functions of an attachment. The attachment coupler (not shown) enables the mechanical coupling of the attachment 105 to the frame 110. The auxiliary port 195, contrary to the attachment coupler, enables the hydraulic coupling of angling hydraulic actuators 198 on the attachment 105 to the hydraulic system. The angling hydraulic actuators 198 on the attachment 105 (e.g. a dozer blade) includes a single tilt hydraulic actuator 187 and a pair of angling hydraulic actuators 198. The tilt hydraulic actuator 187 tilts the attachment 105 relative to the work machine 100, which may also be referred to as moving the attachment 105 in the direction of roll 60. That is, actuating the angling hydraulic actuators 198 (more specifically the tilt hydraulic actuator 187) actuates the attachment and tilts the attachment in a radial motion about the forward portion of the boom assembly 170. The pair of angling hydraulic actuators 198 allow for the attachment 105 to move in the direction of yaw 70 or angle the attachment 105 relative to the frame 110 in the direction of yaw 70.

FIG. 2 is a block diagram of the system architecture of the work machine and the flow of the display system 200 for a work machine 100 having grade control. One known system for grade control is available from Deere & Company of Moline, Ill. as an Integrated Grade Control (IGC) system, which generally is a blade control system using the combination of sensor input (e.g. GPS) and stored data (e.g. maps). The IGC system may also allow for operator control of an initial position setting, such as an initial height of a blade attachment. The IGC system may also allow for a combination of operator and automated position control. For example, the angle of the blade attachment may be initially or continuously under the control of the operator via a user interface, and the tilt of the blade may be controlled automatically according to input from sensors and data storage.

The grade control system comprises a first sensor 205, a second sensor 210, a laser receiver 215, and a controller 10. The first sensor 205 is affixed to the frame 110 of the work machine 100 and configured to provide a first sensor signal 220 indicative of the movement and orientation of the frame 110. In alternative embodiment, the first sensor 205 may not be affixed directly to the frame 110 but instead be connected to the frame through intermediate components or structures. In these alternative embodiment, the first sensor 205 is not directly affixed to the frame 110 but is still connected to the frame at a fixed relative position so as to experience the same motion as the frame 110. The first sensor 205 is configured to generate a first sensor signal 220 indicative of an angle of the frame relative to the direction of gravity 304, an angular measurement in the direction of pitch 65. This first sensor signal 220 may be referred to as a frame inclination signal. The controller 10 may actuate an implement based on the frame inclination angle. The first sensor 205 may also be configured to provide a first sensor signal 220 or signals indicative of other positions or velocities of the frame 110, including, its angular position, velocity, or acceleration in a direction such as the direction of roll 60, pitch 65, yaw 70 or its linear acceleration in a direction such as the direction of longitude 45, latitude 50, and vertical 55. The first sensor 205 may be configured to directly measure inclination, measure angular velocity and integrate to arrive at inclination, or measure inclination and derive to arrive at angular velocity.

The second sensor 210 may provide a blade inclination signal, which indicates the angle of the blade. The second sensor 210 is configured to generate a second sensor signal 225 indicative of an angle of the attachment 105 relative to one of the frame 110 and the direction of gravity 304. The second sensor 210 is affixed to the attachment 105 (shown here as an exemplary embodiment as a blade). The second sensor 210, like the first sensor 205, may be configured to measure angular position (inclination or orientation), velocity, or acceleration, or linear acceleration. In alternative embodiments, the second sensor 210 may be configured to instead measure an angle of linkage, such as an angle between the boom assembly 170 and the frame 110, in order to determine a position of the attachment 105. In alternative embodiments, the second sensor 210 may not be directly affixed to the attachment 105 but may instead be connected to the attachment 105 through intermediate components or structures. In these alternative embodiments, the second sensor 210 is not directly affixed to the attachment 105 but is still connected to the attachment at a fixed relative position so as to experience the same motion as the attachment.

The laser receiver 215 is configured to receive a laser signal 235 from a laser beacon 237. The laser receiver 215 generates a height signal 240 (shown as 240a and 240b for each respective laser receiver) based on the laser signal 235, wherein the height signal 240 is indicative of a position of one of the attachment 105 and the frame 110 relative to the laser beacon 237. Located on a laser mast 115 and by detecting the laser signal 235 from the laser beacon 237, the laser receiver 215 may be configured to monitor the height of the work machine 100 relative to the laser beacon 237. In one exemplary embodiment, the laser beacon 237 may be configured to deliver a laser signal 235 such as a low intensity laser beam that may be swept over a worksite to define a laser plane. The laser beacon 237 may be positioned at a preselected coordinate location with the worksite. A laser beam for example, (i.e. the laser signal 235) may define the laser plane above the worksite at a predetermined elevational position, with the laser plane being substantially parallel to a desired surface grade. The distance between the laser plane and the target grade may thereby establish an elevational coordinate position in the vertical direction 55.

The controller 10 has a non-transitory computer readable medium with a program instruction 40 to grade the surface 135 wherein the program instructions 40 when executed causes a processor 30 of the controller 10 to perform the following steps. The processor 30 will establish a target grade 303 based on a desired grade of the surface 135, and then identify a position of the attachment 105 with respect to one of the frame 110, the surface 135, and the laser signal 235. The processor 30 may then receive the first sensor signal 220 from the first sensor 205, receive the second sensor signal 225 from the second sensor 210, and receive the laser signal 235 from the laser beacon 237. The processor 30 may then generate a first control signal 335 based on the height signal 240 wherein the first control signal 335 causing one or more actuators 197 coupling the attachment 105 to the work machine to maintain the attachment 105 at a position corresponding to the target grade 303 as the work machine 100 propels about a worksite. In the disclosed embodiment, the one or more actuators 197 comprises of the pitch or lift actuators 185, tilt hydraulic actuators 187, and angling hydraulic actuators 198. Other machines may include a different set of actuators coupling the attachment 105 to the work machine 100, for operating linkage kinematics. A target grade 303 input may be acquired from an operator, or alternatively from a databased stored in memory 20.

In the absence of the height signal 240, the processor 30 may generate a second control signal 260 based on one of the first sensor signal 220 and the second sensor signal 225 wherein the second control signal 260 causing one or more actuators 197 coupling the attachment 105 to the work machine 100 to maintain the attachment 105 at a position corresponding to historical value of the grade profile (such as cross slope 301 and the mainfall 302) of the attachment 105 as the work machine 100 propels about a worksite. Mainfall may be the slope in the direction the work machine propels. In other embodiments, the second control signal 260 may be determined a number of ways aside from a historical value. The historical value of the grade profile comprises one of a snapshot in a current, an immediate past, a past point in time or alternatively a past period of time. In one embodiment, the second control signal 260 may be based on a filtered value, or a Kalman filter, or other sensor fusions. For example, in another embodiment the second control signal 260 may be based on an algorithm that tracks the slopes of the laser signal 235 (i.e. the laser plane) and the motion of the work machine 100, and then uses the first sensor 205 and the second sensor 210 (e.g. the IMUs) to predict the motion of the work machine relative to a tacked laser plane when the laser signal 235 is missing. Alternatively, the second control signal 260 may be based on one of the first sensor signal and the second sensor signal 225 and the kinematics between the frame 110 and the attachment to estimate and control the implement height deviation from the historical values of the laser plane through, for example, a Kalman filter.

In this particular embodiment, the laser receiver 215 comprises of a first receiver 275 and a second receiver 280, wherein each receiver is located on a first laser mast 115a and a second laser mast 115b, respectively. Note that first laser mast 115a and second laser mast 115b is collectively referred to as laser masts 115. The laser masts 115 extend upwardly from a location fixed relative to the frame 110. The first and second receivers 275 create a first height signal 240 and a second height signal 240. The height signals 240 enable the controller 10 to calculate one or more of the attributes of a grade profile (such as cross slope 301 and mainfall 302) of the attachment 105. The height signal 240 may possibly automatically control the height of the laser receiver 215 to correspond to the height of the received laser signal 235 as the work machine 100 propels.

A historical value may be derived from a predetermined period of time. The processor 30 will record output from the first sensor 205 and the second sensor 210 (e.g. cross slope 301 and mainfall 302) by deriving a sequence of averages of successive given numbers over a duration of time, and thereby evening out short-term fluctuations and clarifying grade profile trends (such as cross slope 301 and mainfall 302 for example). Alternatively, the historical value may be derived from a predetermined tolerance band and thereby ignore any outliers. In another embodiment, the historical value may be derived from a predetermined number of passes the work machine makes when grading a surface 135.

The controller 10 may further be configured to suspend the auto control mode of maintaining the attachment 105 at a position after a period of time when the second control signal 260 is operating the one or more actuators 197. If the laser receiver 215 continues to fail, by damage for example, or alternatively if the laser beacon 237 discontinues operation wherein a laser signal 235 is no longer transmitted over an extended period of time, auto control mode may be suspended. Alternatively, the controller 10 may notify the operator that performance has degraded and allowing for the operator to decide whether or not to interrupt grade control. A display system 200 may advantageously enable an operator to view the attachment 105 position at a glance. The display system 200 includes a display device 140 to display at least a singular graphic 402a of a position of the attachment 105 relative to a target grade 303 wherein the singular graphic 402a represents a cross slope 301 of the attachment 105 and a mainfall 302 of the attachment 105 relative to either the frame 110 or the target grade 303.

Figure 3:
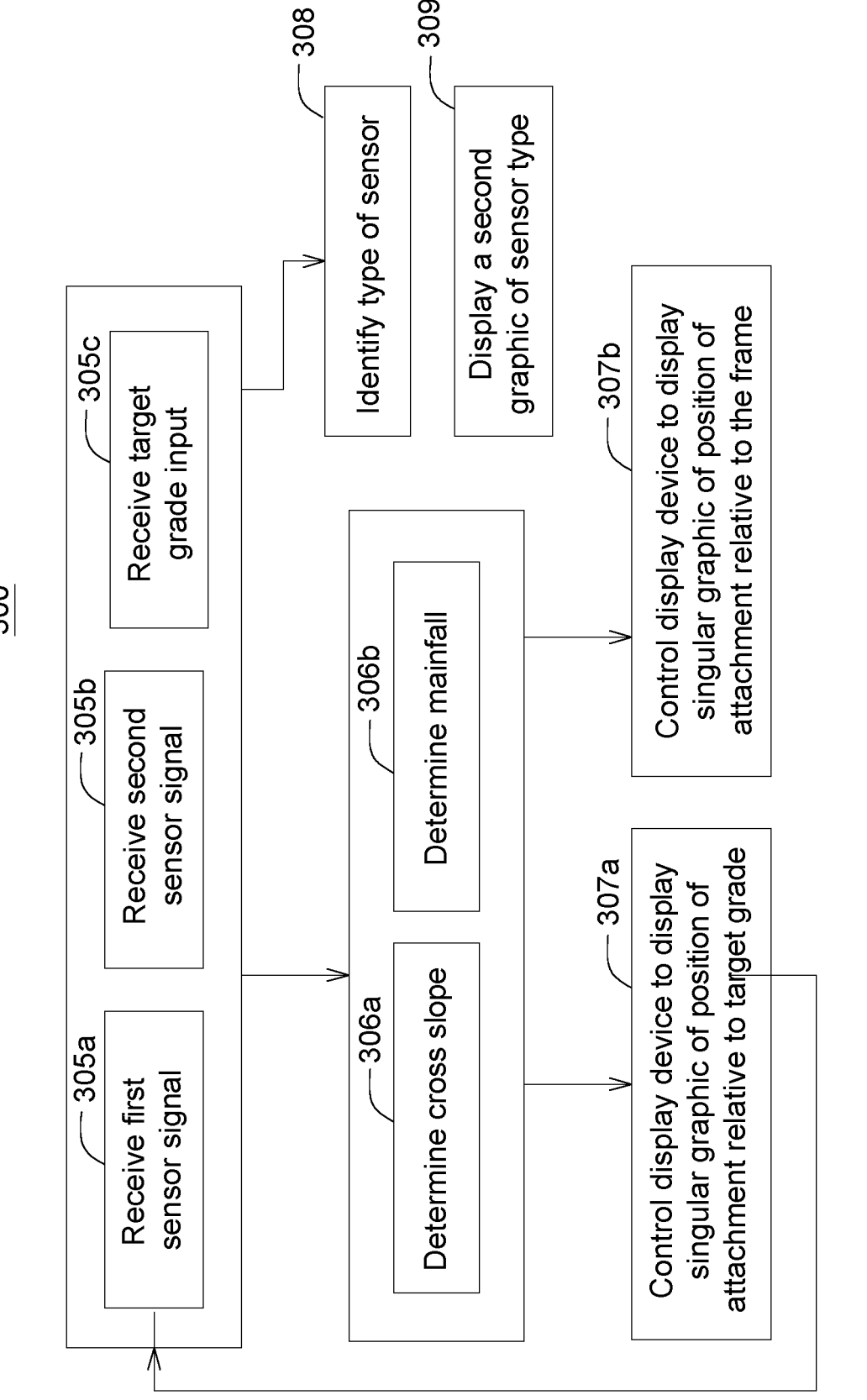
FIG. 3 is a flowchart of a method of controlling work machine having a grade control system.

FIG. 3 discloses a flowchart of a method 300 of controlling a display system 200 for work machine 100 having grade control. In a first step 305a, the method 300 comprises receiving a first sensor signal from a first sensor 205 coupled to a frame 110 of the work machine 100. The first sensor signal is indicative of an angle of the frame 110 relative to the direction of gravity 304. In step 305b, the method 300 includes receiving a second sensor signal 225 from a second sensor 210 coupled to the attachment. The second sensor signal 225 is indicative of an angle of the attachment relative one of the frame 110 and the direction of gravity 304. In step 305c, the method 300 includes receiving a target grade input. Subsequently, in step 306a, the controller 10 determines a cross slope 301 of the attachment 105, and in step 306b determine a mainfall 302 of the attachment. In step 307a, the method 300 may include controlling a display device 140 to display a singular graphic 402 of a position of the attachment 105 relative to the target grade 303 wherein the singular graphic 402 represents a cross slope 301 of the attachment 105 and a mainfall 302 of the attachment relative to the target grade 303. Alternatively, the method 300 in step 307b may include controlling the display device 140 (shown in FIG. 4) to display a singular graphic 402 of a position of the attachment 105 relative to the target grade 303 wherein the singular graphic 402 represents a cross slope 301 of the attachment and a mainfall 302 of the attachment 105 relative to the frame 110.

Figure 4:
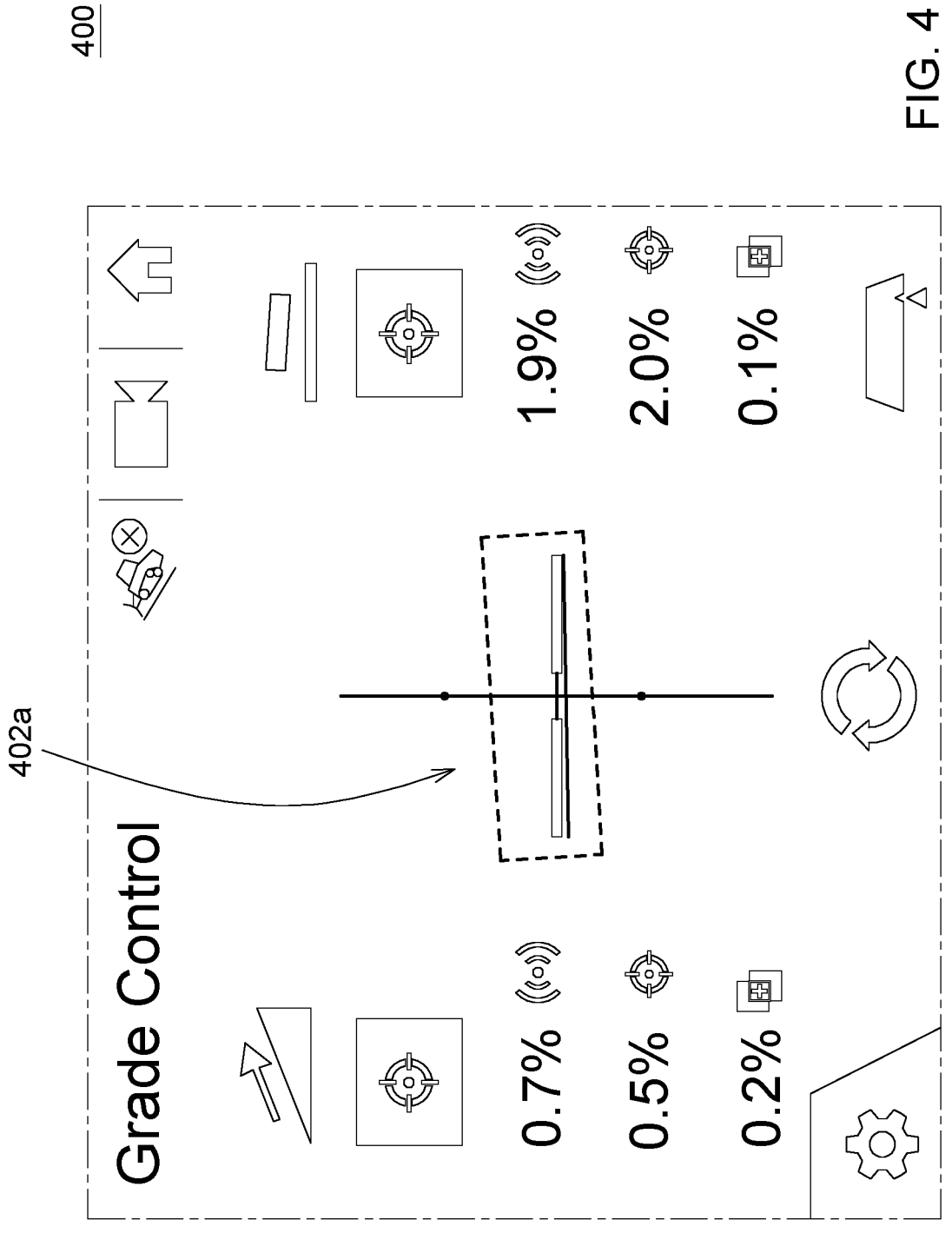
FIG. 4 is an exemplary embodiment of the display on a display device.

FIG. 4 discloses an exemplary embodiment of the display 400 on the display device 140. A singular graphic 402a advantageously enables the operator to view the performance of the grade control in real-time at a glance.

Figures 5A, 5B:
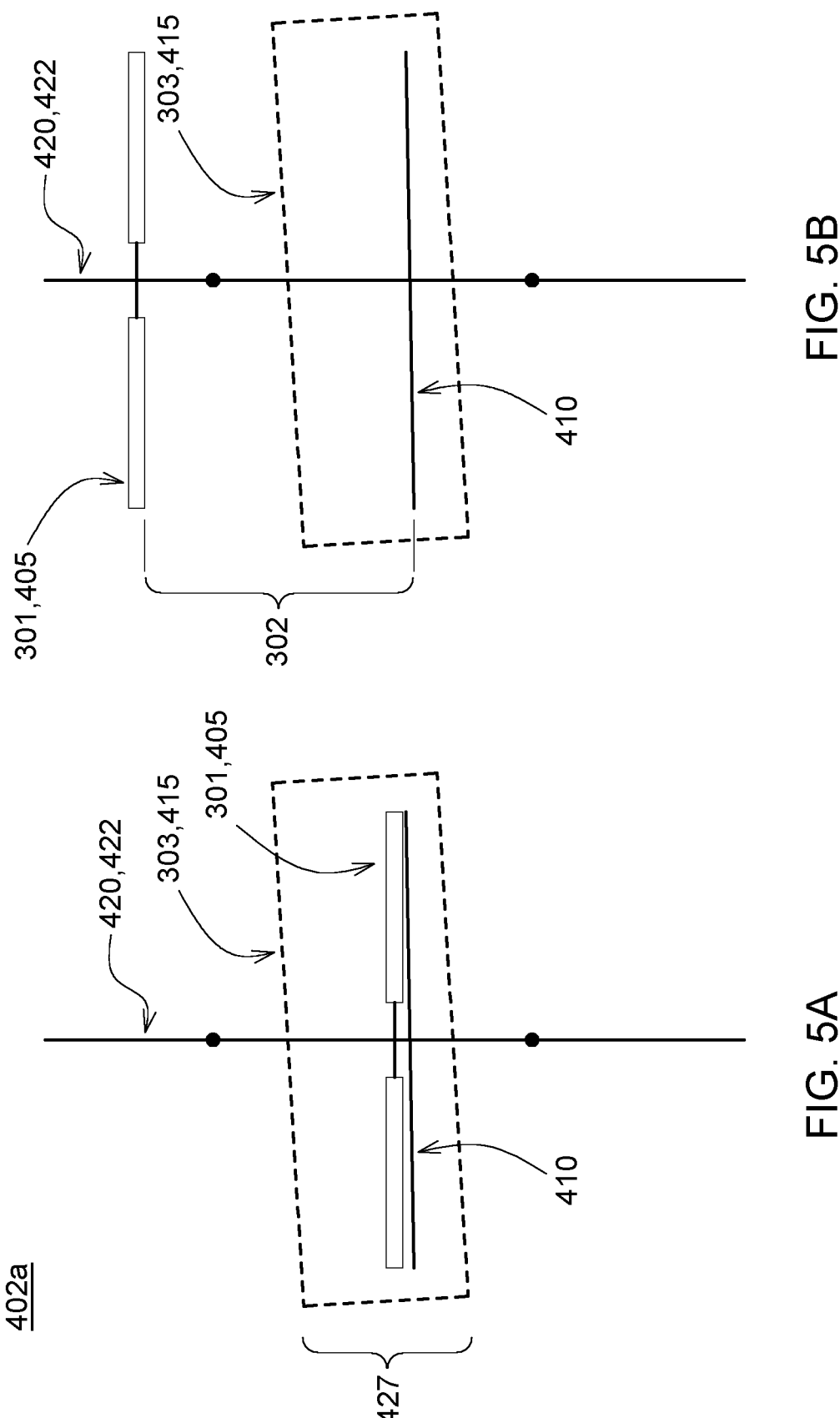
FIG. 5a is a detailed view of the singular graphic of a first position of the attachment according to a first embodiment.
FIG. 5b is a detailed view of the singular graphic of a second position of the attachment according to the first embodiment.

FIG. 5a is a detailed view of the singular graphic 402 of a first position of the attachment 105 according to a first embodiment 402a. The singular graphic 402a comprises of a first graphic element 405 representing a cross slope 301 of the attachment 105; a second graphic element 410 representing a frame reference 460 indicative of a position of the first graphic element 405 relative to the second graphic element 410; and a third graphic element 415 representing the target grade 303. With respect to grade control, the first graphic element 405 may represent the cross slope 301 of the cutting edge 189 of the attachment 105, or alternatively a horizontal centerline 80 of the attachment 105 in a direction perpendicular to the longitudinal axis 45 of the work machine 100. FIG. 1 shows a skid steer with a blade. Another embodiment may be an excavator wherein the first graphic element 405 may represent the cutting edge 189 of a bucket. The cross slope 301 of the attachment 105 may be based on either the frame 110 (as shown by the frame reference 460) or alternatively the direction of gravity 304. The direction of gravity 304 may be acquired by a sensor, as known by a person of skill in the art (e.g. an IMU). In one embodiment, the second graphic 410 element may be a horizontal line. That is, the second graphic element 410 may maintain itself as a horizontal line regardless of the whether the frame 110 of the work machine 100 is on a cross slope 301 (e.g. a hill). Another graphic element (not part of the singular graphic 402) may be shown on the display 400 as a mode indicating whether the horizontal line represents the frame 110 or the direction of gravity 304.

Figure 6:
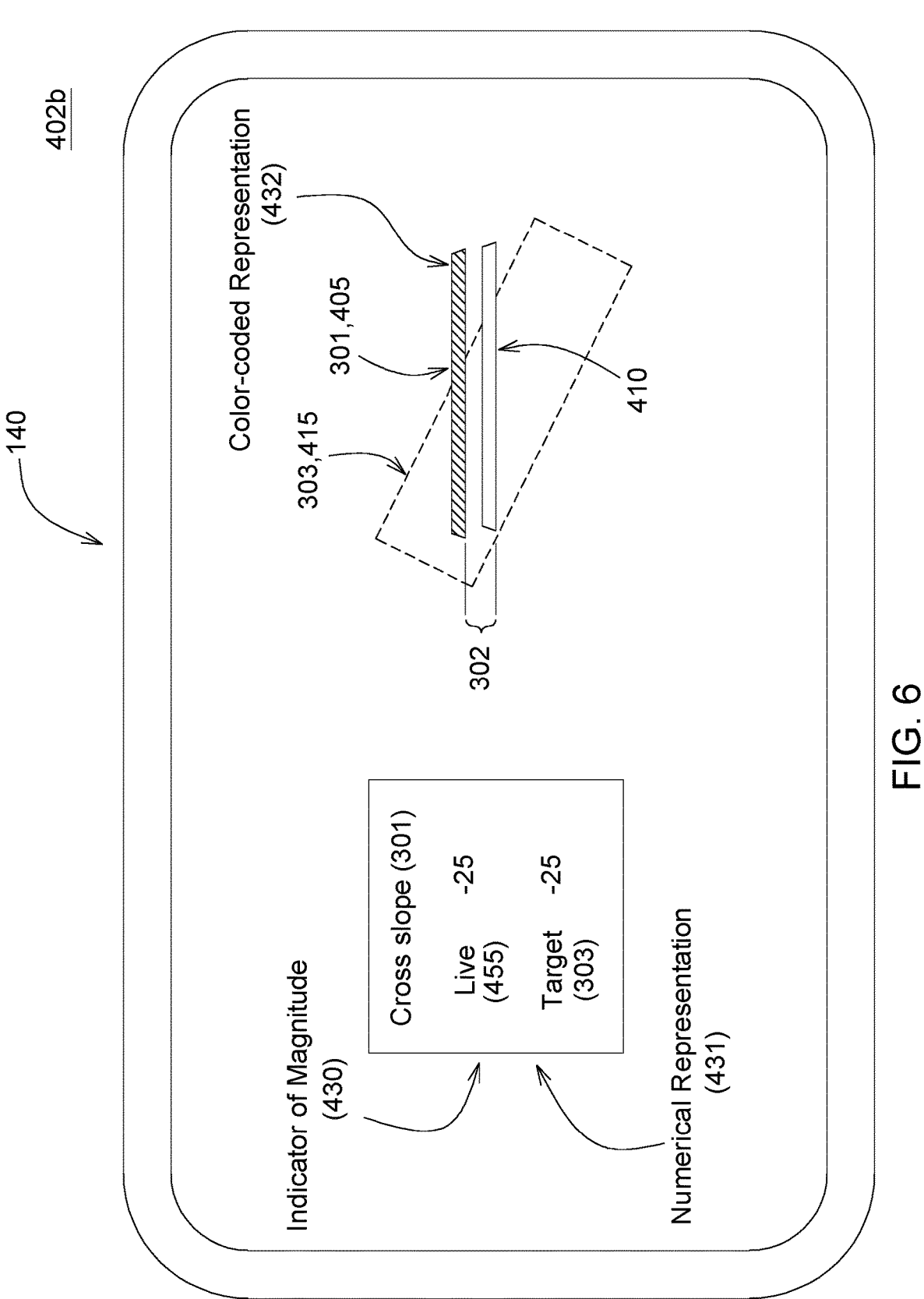
FIG. 6 is a detailed view of the singular graphic of a position of the attachment according to a second embodiment.

The singular graphic 402 may further comprise of a fourth graphic element 420 comprising of a vertical line 422 creating a crosshair with the second graphic element 410 wherein vertical placement of the first graphic element 405 relative to the second graphic element 410 along the vertical line 422 represents the mainfall 302 of the attachment 105. FIG. 5b is a singular graphic 402 shown in FIG. 5a with the attachment 105 in a second position wherein the mainfall 302 is higher. FIG. 6 shows an alternative embodiment of the singular graphic 402b wherein the vertical line 422 is absent but the relative position the second graphic element 410 relative to the first graphic element 405 still communicates a mainfall 302 on the display 400.

The mainfall 302 of the attachment 105 may be determined based on one of the frame 110 and the direction of gravity 304. Another dimension may add to the vertical line 422 wherein placement of the vertical line 422 in the x-direction 50 represents a vertical centerline 75 of the attachment 105 (shown in FIG. 1).

In the embodiment shown, the third graphic element 415, or target grade 303, may be rectangular (shown here as dotted). That is, the target grade 303 is represented by two parallel lines in the x-direction indicating the cross slope 301 of the target grade 303, wherein the spacing between the two parallel lines represents the tolerance 427 window of the cross slope 301. The relative position of the third graphic element 415 relative to the second graphic element 410 represents the tolerance 427 of the mainfall 302 as well. Although shown as a dotted line rectangle, the two parallel lines are sufficient in representing the tolerance of both the cross slope 301 and the mainfall 302. The display of the singular graphic advantageously provides a dynamic snapshot of the current live position 455 and the target grade 303 in real-time. The target grade 303 may also be variable based on location-based programming.

As shown in FIG. 6, the display device 140 may further comprise of an indicator 430 of magnitude for at least one of the cross slope 301 and the mainfall 302. The indicator 430 may include a numerical representation 431 of the magnitudes of at least one of the cross slope 301 and the mainfall 302. Alternatively, the indicator 430 may include a color-coded representation 432 of the magnitudes of at least one of the cross slope 301 and the mainfall 302. For example, green may indicate the grade of the attachment being within grade tolerance 427. Yellow may indicate the attachment grade being near the grade tolerance 427, or alternatively indicating that one of the cross slope 301 and the mainfall 302 being out tolerance 427. Red may indicate a grade attachment completely out of tolerance 427.

In step 308, the method 300 may further comprise of identifying a sensor type of the first sensor 205 and the second sensor 210. The method 300 may include step 309 of controlling a display device to display a second singular graphic identifying the sensor input. The sensor composition providing the inputs for grade control may vary from one work machine 100 to another based on the type of work machine 100, work application, attachment, and operator. This may include lidar, IMUs, sonar, and image sensors, for example. The singular graphic 402 having the graphic elements (405, 410, 415) is universally applicable across several platforms and therefore advantageously creates a cohesive and simplified means of sharing grade control information.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of" "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The invention claimed is:

1. A display system for a work machine having a grade control, the display system comprising:

a body frame of the work machine;

an attachment movably coupled to the body frame via a boom assembly;

a first sensor configured to generate a first sensor signal indicative of a body frame angle relative to a direction of gravity;

a second sensor configured to generate a second sensor signal indicative of an attachment angle relative to one of the body frame and the direction of gravity; and a controller having a non-transitory computer readable medium with a program instruction to grade a surface, the program instructions when executed causing a processor of the controller:

receiving the first sensor signal from the first sensor coupled to the body frame;

receiving the second sensor signal from the second sensor coupled to the attachment;

receiving a target grade input;

determining a cross slope of the attachment;

determining a mainfall of the attachment; and controlling a display device to display a singular graphic of a position of the attachment relative to a target grade, wherein the singular graphic represents the cross slope of the attachment and the mainfall of the attachment relative to the body frame, wherein the singular graphic includes a first graphic element representing the cross slope of the attachment, a second graphic element representing a body frame reference for the first graphic element, the relative positioning of the first graphic element relative to the second graphic element in a vertical direction representing the mainfall of the attachment relative to the body frame.

2. The display system of claim 1 wherein the singular graphic comprises:

a third graphic element representing the target grade.

3. The display system of claim 2 wherein the second graphic element is a horizontal line.

4. The display system of claim 2, wherein the singular graphic further comprises a fourth graphic element comprising of a vertical line creating a crosshair with the second graphic element wherein vertical placement of the first graphic element relative to the second graphic element represents the mainfall of the attachment.

5. The display system of claim 2 wherein the third graphic element is rectangular.

6. The display system of claim 5 wherein the third graphic element further represents a tolerance of the target grade.

7. The display system of claim 1 further comprising one of a numerical representation of a magnitude of one of the cross slope and the mainfall; and a color-coded representation of the magnitude of one of the cross slope and the mainfall.

8. The display system of claim 1 wherein the singular graphic is a representation of a cutting edge of the attachment relative to the body frame.

9. A method of controlling a work machine having a grade control system, the method comprising:

receiving a first sensor signal from a first sensor coupled to a body frame of the work machine, the first sensor signal indicative of a body frame angle relative to a direction of gravity;

receiving a second sensor signal from a second sensor coupled to an attachment coupled to the body frame, the second sensor signal indicative of an attachment angle relative to one of the body frame and the direction of gravity;

receiving a target grade input;

determining a cross slope of the attachment;

determining a mainfall of the attachment; and controlling a display device to display a singular graphic of a position of the attachment relative to a target grade, the singular graphic representing the cross slope of the attachment and the mainfall of the attachment relative to the target grade, the singular graphic including a first graphic element representing the cross slope of the attachment, a second graphic element representing a body frame reference for the first graphic element, the relative positioning of the first graphic element relative to the second graphic element in a vertical direction representing the mainfall of the attachment relative to the body frame, and a third graphic element representing the target grade; and automatically controlling the position of the attachment based on the first sensor signal and the second sensor signal towards the target grade.

10. The method of claim 9 wherein the second graphic element is a horizontal line.

11. The method of claim 10 further comprising a fourth graphic element comprising of a vertical line creating a crosshair with the second graphic element wherein vertical placement of the first graphic element relative to the second graphic element on represents the mainfall of the attachment.

12. The method of claim 9 wherein the third graphic element is rectangular.

13. The method of claim 12 wherein the third graphic element further represents a tolerance of the target grade.

14. The method of claim 9 wherein the third graphic element represents a tolerance of the target grade.

15. The method of claim 9 wherein the singular graphic comprises at least one of a numerical representation of a magnitude of one of the cross slope and the mainfall; and a color-coded representation of the magnitude of one of the cross slope and the mainfall.

16. The method of claim 9 wherein the singular graphic is a representation of a cutting edge of the attachment.

17. The method of claim 9 further comprising:

identifying a sensor type of the first sensor and the second sensor; and controlling the display device to display a second graphic of the sensor type.

18. A method of controlling a work machine having a grade control system, the method comprising:

receiving a first sensor signal from a first sensor coupled to a body frame of the work machine, the first sensor signal indicative of a body frame angle relative to a direction gravity;

receiving a second sensor signal from a second sensor coupled to the attachment coupled to the body frame, the second sensor signal indicative of an attachment angle relative to one of the body frame and the direction of gravity;

receiving a target grade input;

determining a cross slope of the attachment;

determining a mainfall of the attachment; and controlling a display device to display a singular graphic of a position of the attachment relative to the body frame in an operator facing direction, the singular graphic representing a cross slope of the attachment with a first graphic element and a mainfall of the attachment with a second graphic element, and a third graphic element representing a target grade wherein the relative positioning of the first graphic element relative to the second graphic element in a vertical direction represents the mainfall of the attachment relative to the body frame; and automatically controlling the position of the attachment based on the first sensor signal and the second sensor signal towards a target grade.

19. The method of claim 18 further comprising a fourth graphic element comprising of a vertical line creating a crosshair with the second graphic element wherein vertical placement of the first graphic element relative to the second graphic element represents the mainfall of the attachment.

20. The display system of claim 1 further comprising:

a laser signal for generating a tacked plane as a reference for determining the relative motion of the body frame of the work machine as indicated by the first sensor signal.

21. The display system of claim 1, wherein the target grade is variable based on a location-based input.

* * * * *